(12) United States Patent
Gorokhov et al.

(10) Patent No.: US 7,120,209 B2
(45) Date of Patent: Oct. 10, 2006

(54) REDUCED COMPLEXITY INTERCARRIER INTERFERENCE CANCELLATION

(75) Inventors: Alexei Gorokhov, Eindhoven (NL); Johan Paul Marie Gerard Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 816 days.

(21) Appl. No.: 10/078,936

(22) Filed: Feb. 19, 2002

(65) Prior Publication Data

US 2002/0181625 A1 Dec. 5, 2002

(30) Foreign Application Priority Data

Feb. 22, 2001 (EP) .................................. 01200684

(51) Int. Cl.
*H03D 1/04* (2006.01)
(52) U.S. Cl. ..................................................... 375/346
(58) Field of Classification Search ................ 375/148, 375/223, 229, 316, 343, 346, 348, 350, 351; 455/296
See application file for complete search history.

(56) References Cited

U.S. PATENT DOCUMENTS

| | | | | |
|---|---|---|---|---|
| 4,571,733 A | * | 2/1986 | Kaku et al. ................... | 375/231 |
| 5,802,117 A | * | 9/1998 | Ghosh .......................... | 375/344 |
| 6,240,099 B1 | * | 5/2001 | Lim et al. ..................... | 370/441 |
| 6,456,654 B1 | * | 9/2002 | Ginesi et al. ................. | 375/229 |
| 6,526,103 B1 | * | 2/2003 | Li et al. ....................... | 375/316 |
| 6,603,811 B1 | * | 8/2003 | Dobson et al. .............. | 375/232 |
| 6,654,408 B1 | * | 11/2003 | Kadous et al. .............. | 375/148 |
| 6,714,520 B1 | * | 3/2004 | Okamura ..................... | 370/286 |
| 6,724,809 B1 | * | 4/2004 | Reznik ......................... | 375/148 |
| 6,765,969 B1 | * | 7/2004 | Vook et al. .................. | 375/259 |

OTHER PUBLICATIONS

A. G. Koppelaar; "Matrix Equalization for OFDM Systems", Symposium on Information Theory in the Benelux, May 1993, pp. 236-243, XP000199843.
J. Linnartz et al; "Doppler-Resistant OFDM Receivers for Mobile Multimedia Communications", Proceedings of the International Symposium of Mobile Multimedia Systems and Applications, Nov. 9-10, 2000, pp. 87-92, XP00104332.
Jeon Won Gi et al; "An Equalization Technique for Orthogonal Frequency-Division Multiplexing Systems in Time-Variant Multipath Channels", IEEE Transactions on Communications, vol. 47, No. 1 Jan. 1999.

* cited by examiner

*Primary Examiner*—Jay K. Patel
*Assistant Examiner*—Lawrence B. Williams
(74) *Attorney, Agent, or Firm*—Larry Liberchuk

(57) ABSTRACT

Described is a transmission system for transmitting a multicarrier signal from a transmitter (10) to a receiver (20). The receiver (20) comprises an equalizer (24) for canceling intercarrier interference which may be included in the received multicarrier signal. The equalizer (24), which preferably is a MMSE equalizer, comprises a reduced complexity filter for deriving a vector of estimated symbols (25) from a vector of received symbols (23). The reduced complexity filter comprises a multiplication of an approximation of an inverse matrix $R^{-1}$ with the vector of received symbols (23). The approximation of the inverse matrix $R^{-1}$ is preferably a first order approximation.

15 Claims, 2 Drawing Sheets

REDUCED COMPLEXITY INTERCARRIER INTERFERENCE CANCELLATION

BACKGROUND OF THE INVENTION (1) Field of the Invention.

The invention relates to a transmission system for transmitting a multicarrier signal from a transmitter to a receiver.

The invention further relates to a receiver for receiving a multicarrier signal from a transmitter, an equalizer for canceling intercarrier interference included in a multicarrier signal, and to a method of canceling intercarrier interference included in a multicarrier signal.

(2) Background Art.

Multicarrier signal modulation methods, such as OFDM and MC-CDMA, have been around for some time now. OFDM or Orthogonal Frequency Division Multiplexing is a modulation method designed in the 1970's in which multiple user symbols are transmitted in parallel using different subcarriers. These subcarriers have overlapping (sinc-shaped) spectra, nonetheless the signal waveforms are orthogonal. Compared to modulation methods such as BPSK, QPSK or MSK, OFDM transmits symbols which have a relatively long time duration, but a narrow bandwidth. Mostly, OFDM systems are designed such that each subcarrier is small enough in bandwidth to experience frequency-flat fading. This also ensures that the subcarriers remain orthogonal when received over a (moderately) frequency selective but time-invariant channel. If the OFDM signal is received over such a channel, each subcarrier experiences a different attenuation, but no dispersion.

The above mentioned properties of OFDM avoid the need for a tapped delay line equalizer and have been a prime motivation to use OFDM modulation methods in several standards, such as Digital Audio Broadcasting (DAB), the Digital Terrestrial Television Broadcast (DTTB) which is part of the Digital Video Broadcasting standard (DVB), and more recently the wireless local area network standard HIPERLAN/2. Particularly in the DAB and DTTB applications, mobile reception under disadvantageous channel conditions are foreseen, with both frequency and time dispersion. Mobile reception of television has not been regarded as a major market up to now. Nonetheless, the DVB system promises to become a high-speed delivery mechanism for mobile multimedia and internet services. At the IFA '99 Consumer Electronics trade show, a consortium of Nokia, Deutsche Telecom and ZDF demonstrated mobile web browsing, email access and television viewing over an OFDM DVB link, with a GSM return channel. With 8k OFDM subcarriers, over the air DVB reception functioned properly for vehicle speeds up to 50 mph. Mobile reception, i.e. reception over channels with Doppler spreads and the corresponding time dispersion remains one of the problems associated with OFDM systems in particular and multicarrier transmission systems in general. Whereas its robustness against frequency selectivity is seen as an advantage of OFDM, the time-varying character of the channel is known to limit the system performance. Time variations are known to corrupt the orthogonality of the OFDM subcarrier waveforms. In such a case, Intercarrier Interference (ICI, also referred to as interchannel interference or FFT leakage) occurs because signal components from one subcarrier cause interference to other, mostly neighboring, subcarriers.

In the paper "An Equalization Technique for Orthogonal Frequency-Division Multiplexing Systems in Time-Variant Multipath Channels", IEEE transactions on Communications, Vol. 47, No. 1, January 1999, pages 27–32, a multicarrier transmission system is disclosed. In this known transmission system ICI is cancelled (i.e. detected and removed from the received multicarrier signal) in the receiver by means of an equalizer. This equalizer comprises a digital filter which derives a vector of estimated symbols from a vector of received symbols. The filter in the known transmission system is relatively complex, i.e. a relatively large number of computations is needed to implement the filter.

BRIEF SUMMARY OF THE INVENTION

It is an object of the invention to provide a transmission system according to the preamble in which the computational burden is substantially reduced. This object is achieved in the transmission system according to the invention, said transmission system being arranged for transmitting a multicarrier signal from a transmitter to a receiver, the receiver comprising an equalizer for canceling intercarrier interference included in the received multicarrier signal, wherein the equalizer comprises a reduced complexity filter for deriving a vector of estimated symbols from a vector of received symbols. The invention is based upon the recognition that the complexity of the filter can be substantially reduced without seriously affecting the ICI cancellation procedure.

In an embodiment of the transmission system according to the invention the equalizer is a MMSE equalizer which is a linear filter which extracts the transmitted symbols of each subcarrier so that the signal to interference and noise ratio (SINR) is maximized.

In a further embodiment of the transmission system according to the invention the reduced complexity filter comprises a multiplication of an approximation of an inverse matrix $R^{-1}$ with the vector of received symbols. In order to arrive at the vector of estimated symbols the filter has to multiply the vector of received symbols with an inverse N×N matrix, with N being the number of subcarriers. This results in the known transmission system in a substantial computational burden, mainly because of the matrix inversion which has a complexity that is cubic with respect to N. A reduced complexity filter can be realized by implementing the matrix inversion in a more efficient manner, e.g. by approximating the inverse matrix $R^{-1}$. Computer simulations have shown that already a first order approximation of the inverse matrix $R^{-1}$ gives good results.

The above object and features of the present invention will be more apparent from the following description of the preferred embodiments with reference to the drawings, wherein:

DETAILED DESCRIPTION OF THE INVENTION

Figure 1:
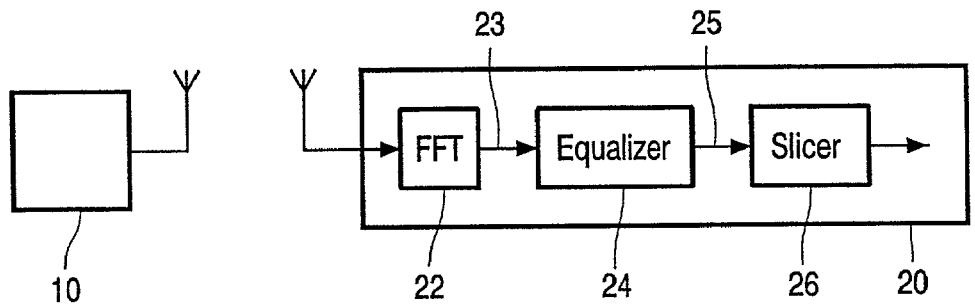
FIG. 1 shows a block diagram of a transmission system according to the invention.

The invention is based upon the development of a simple and reliable channel representation. Consider a multicarrier transmission system, e.g. an OFDM or MC-CDMA transmission system, with N subcarriers spaced by $f_s$. Each subcarrier has a rectangular envelope of a finite length that, including the cyclic extension, exceeds $(1/f_s)$. Let $s = [s_1, \ldots, s_N]^T$ be a vector of N transmitted symbols, then the transmitted continuous time baseband signal may be written as follows:

$$x(t) = \sum_{k=1}^{N} s_k \exp(i 2\pi f_s k t). \quad (1)$$

In the case of a frequency selective time-varying additive white Gaussian noise (AWGN) channel, the received continuous time signal may be written as follows:

$$y(t) = \sum_{k=1}^{N} s_k H_k(t) \exp(i 2\pi f_s k t) + n(t), \quad (2)$$

wherein the coefficient $H_k(t)$ represents the time-varying frequency response at the k-th subcarrier, for $1 \leq k \leq N$, and wherein n(t) is AGWN within the signal bandwidth. We assume that the channel slowly varies so that only a first order variation may be taken into account within a single data block duration. In other words, we assume that every $H_k(t)$ is accurately approximated by $$H_k(t) \approx H_k(t_r) + H_k'(t_r)(t - t_r), \quad (3)$$

wherein $H_k'(t)$ is the first order derivative of $H_k(t)$ and wherein $t_r$ is a reference time within the received data block. Note that the time varying channel $H_k(t)$ may also take into account a residual frequency offset, after the coarse frequency synchronization.

The received baseband signal is sampled with a sampling offset $t_o$ and a rate $Nf_s$ and a block of its N subsequent samples $[y(t_o), y(t_o+T), \ldots, y(t_o+(N-1)T)]$ $$\left( \text{with } T = \frac{1}{Nf_s} \right)$$

is subject to a fast fourier transform (FFT) of size N. Let $y = [y_1, \ldots, y_N]^T$ be the vector of N FFT samples so that $$y_k = \frac{1}{N} \sum_{n=0}^{N-1} y(t_o + nT) \exp(-i 2\pi k n / N). \quad (4)$$

After substituting (2) into (4) and using the approximation (3), we obtain $$y_k = a_k s_k + \sum_{l=0}^{N-1} d_l s_l \sum_{n=0}^{N-1} (n/N) \exp(-i 2\pi (k-l) n / N) + n_k, \quad (5)$$

$$a_l = \exp(i 2\pi f_s l t_0)(H_1(t_r) + H_1'(t_r)(t_0 - t_r)), \quad (6)$$

$$d_l = \exp(i 2\pi f_s l t_0) T H_1'(t_r), \quad (7)$$

wherein $n_k$, for $1 \leq k \leq N$, are the samples of AWGN having a certain variance $\sigma^2$. It is convenient to rewrite the result (5) in a close matrix form. To this end, we define diagonal matrices $A = \text{diag}\{a_1, \ldots, a_N\}$, $D = \text{diag}\{d_1, \ldots, d_N\}$ and an N×N matrix $$\Xi = \{\Xi_{p,q}\}_{p,q=1}^{N}, \Xi_{p,q} = \sum_{n=0}^{N-1} (n/N) \exp(-i 2\pi (p-q) n / N). \quad (8)$$

With this notation, the expression (5) is equivalent to $$y = As + \Xi Ds + n, \quad (9)$$

wherein $n = [n_1, \ldots, n_N]^T$ is an N×1 vector of AWGN. In the channel model (9), the effect of the channel is represented by two sets of N parameters $a = [a_1, \ldots, a_N]^T$ and $d = [d_1, \ldots, d_N]^T$. Check that $H_1(t_r) + H_1'(t_r)(t_o - t_r) \approx H_1(t_o)$, hence the coefficients $a_k$, for $1 \leq k \leq N$, are equal to the complex amplitudes of the channel frequency response rotated by the sampling phase $\exp(i 2\pi f_s l t_0)$. Similarly, the coefficients $d_k$, for $1 \leq k \leq N$, are equal to the time-domain derivatives of the complex amplitudes of the channel frequency response scaled by the sampling period T and rotated by the same sampling phase $\exp(i 2\pi f_s l t_0)$.

Note that an inter-carrier interference occurs when the channel response varies in time (i.e. $d \neq 0$). This interference is defined by the vector d as well as the fixed N×N matrix $\Xi$. It can be is easily seen that according to (8) the latter matrix is a Toeplitz Hermitian matrix and that $$\Xi = \{\Xi_{p,q}\}_{p,q=1}^{N}, \Xi_{p,q} = \begin{cases} (N-1)/2, & p = q; \\ -(1 - e^{i 2\pi (q-p)/N})^{-1}, & p \neq q. \end{cases}$$

Later in this document, we will call a the (vector of) amplitudes, d the (vector of) derivatives and $\Xi$ the leakage matrix.

To process the received signal, the set of channel parameters a and d should be estimated. The estimation accuracy of these 2N scalar parameters may be enhanced if the statistical properties of the channel are used. First of all, we assume that channel variations are slow enough so that $H_k'(t)$ do not change substantially within the duration of a symbol. In this case, we may rewrite (6) and (7) as follows:

$$a_l \approx \exp(i 2\pi f_s l t_o) H_1(t_o), \ d_l \approx \exp(i 2\pi f_s l t_o) T H_1'(t_o), \quad (10)$$
$$1 \leq l \leq N.$$

Let us analyze the relationship between the quantities a, d and physical parameters of the propagation channel, namely the set of its K propagation delays $\{\tau_0, \ldots, \tau_K\}$, the corresponding Doppler shifts $\{f_0, \ldots, f_K\}$, and complex amplitudes $\{h_0, \ldots, h_K\}$. Note that the statistical properties of the channel frequency response depend on the relative delays and Doppler shifts whereas the group delay and/or Doppler shift result in rotations of $h_k$, for $1 \leq k \leq K$; these rotations are handled by time and carrier synchronization/tracking. Hence, we may assume without loss of generality that $\tau_0 = 0$ and $f_0 = 0$. Now, the channel frequency response $H_l$ and its derivative $H_l'$ may be written as follows:

$$H_l(t) = \sum_{n=0}^{K} h_n \exp(i 2\pi (f_n t - f_s l \tau_n)), \quad (11)$$

-continued $$H'_l(t) = i2\pi \sum_{n=0}^{K} f_n h_n \exp(i2\pi(f_n t - f_s l\tau_n)), \ 1 \le l \le N.$$

The relationships (10) and (11) may be readily used to deduce the statistical properties of the amplitudes a and derivatives d. Whenever the number of propagation paths is big enough (ideally K>>N), the set of coefficients $\{H_1(t), H_1'(t)\}_{1 \le l \le N}$ may be considered jointly Gaussian distributed. Moreover, one can show that the sets $\{H_1(t)\}_{1 \le l \le N}$ and $\{H_1'(t)\}_{1 \le l \le N}$ are mutually uncorrelated when the sets $\{h_k\}_{1 \le k \le K}$ and $\{f_k\}_{1 \le k \le K}$ are statistically independent and the Doppler spectrum has a symmetric shape. In this case, the vectors a and d may be assumed statistically independent multivariate Gaussian with zero mean and covariance matrices $$E\{aa^H\}=C_a, \ E\{dd^H\}=C_d \quad (12)$$

where $E\{\cdot\}$ stands for the mathematical expectation operator and $C_a, C_d$ are N×N Hermitian non-negative definite matrices.

An important particular case of $C_a$ and $C_d$ corresponds to a standard model for mobile channels, as described in the book Microwave Mobile Communications by C. Jakes, John Wiley & Sons, Inc., 1974. This model (known as Jakes model) assumes independent contributions of different propagation paths, an exponential delay profile and uniformly distributed angles of incidence for different paths. One can show that in this case, $$C_a = C, \ C_d = \gamma^2 C, \ \gamma^2 = \frac{1}{2}(2\pi f_\Delta T)^2, \quad (13)$$

$$C_{pq} = \frac{1}{1 + i2\pi(p-q)f_s T_\Delta},$$

$$1 \le p, q \le N,$$

wherein $f_\Delta$ is the magnitude of the Doppler spread and wherein $T_\Delta$ is the root mean square propagation delay spread. The last two parameters depend on the mobile velocity and propagation environment respectively.

Although the outlined channel model is characterized by 2N parameters, the number of independent degrees of freedom is substantially smaller in practice. This property comes from the fact that the propagation delay spread is often much smaller than the word duration. This property also means that the entries of a are strongly correlated, to the extend that the covariance matrix $C_a$ may be accurately approximated by a low-rank matrix. Similarly, the entries of d are strongly correlated and the covariance matrix $C_d$ may also be accurately approximated by a low-rank matrix. Let us consider the Jakes model and therefore (13). Define the eigendecomposition of C:

$$C = U\Lambda U^H, \quad (14)$$

wherein U is the N×N unitary matrix of eigenvectors of C and wherein $\Lambda$ is the N×N positive diagonal matrix of its eigenvalues $\{\Lambda_1, \ldots, \Lambda_N\}$. Assume that the eigenvalues are ordered so that the sequence $\{\Lambda_1, \ldots, \Lambda_N\}$ is non-increasing. Under Jakes model, the elements of this sequence have an exponentially decaying profile:

$$\Lambda_k \sim \exp(-f_s T_\Delta k), \text{ for } 1 \le k \le N. \quad (15)$$

Hence, the sequence of eigenvalues may be accurately approximated with a relatively small number r of non-zero values: $\{\Lambda_1, \ldots, \Lambda_N\} \approx \{\Lambda_1, \ldots, \Lambda_r, 0 \ldots 0\}$.

The aforementioned properties of the channel parameters (i.e. amplitudes and derivatives) can be extensively used to derive reduced complexity procedures for channel equalization with ICI removal.

Whenever the amplitudes a and derivatives d are known (or accurately estimated) and noise is assumed white of power $\sigma^2$, the linear Minimum Mean Square Error (MMSE) estimate of the emitted symbols is given by the expression $$\hat{s} = B^H R^{-1} y, \text{ where } B = (A + \Xi D), \ R = [BB^H + \sigma^2 I_N] \quad (16)$$

This expression (16) becomes clear after rewriting expression (9) as y=Bs+n and noting that $E\{nn^H\}=\sigma^2 I_N$, where $I_N$ is the N×N identity matrix. A direct implementation of expression (16) yields a complexity proportional to $N^3$ since the overall burden is dominated by the inversion of a N×N matrix. The expression (16) may be simplified by making use of the following two observations:

(A). The matrix $\Xi$ may be approximated by a band matrix with (2m+1) nonzero diagonals. Indeed, the absolute values of $|\Xi_{p,q}|$ decrease along with $|p-q|$ at the rate $(|p-q|)^{-1}$ (for $|p-q|<<N$). Consequently, the contribution of the q-th subcarrier to the p-th subcarrier has a power profile decreasing as $(1/m^2)$, wherein $m=|p-q|$. Integrating over all q such that $m>|p-q|$, we conclude that the residual ICI resulting from all subcarriers spaced by more than m subcarrier spacings from the analyzed subcarrier has a power profile that decreases as $1/(m+1)$. In other words, the described band approximation of the leakage matrix suggests a gain of about (m+1) in terms of the output SINR as compared to a conventional OFDM system in which no ICI cancellation is performed.

(B). The amplitudes have essentially stronger contributions to the received signal than the derivatives. Indeed, the ratio of these contributions will be around 20 dB for a DVB-T system operating in 8 k mode when the mobile speed is 100 km/h. Consequently, the diagonal elements of B (and R) dominate over its off-diagonal elements. As a matter of fact, the inverse of a quasi-identity matrix permits an accurate first order approximation, namely $[I+\Delta]^{-1}=I-\Delta+O(\Delta^2)$, wherein $O(\Delta^2)$ denotes a term of the order $\Delta^2$. Such a first order approximation will allow to increase the output SINR over its upper bound defined by the ICI floor in the conventional OFDM system (which does not employ ICI cancellation) when the input signal-to-noise ratio (SNR) is higher than the ICI floor.

Define a band-matrix $\underline{\Xi}$ whose (2m+1) nonzero diagonals are defined by the corresponding diagonals of $\Xi$. Also, define $$\underline{B} = A + \underline{\Xi} D, \ \underline{R} = (\underline{B}\underline{B}^H + \sigma^2 I_N), \ P = \text{diag}\{\text{diag}\{\underline{R}\}\},$$

$$Q = (\underline{R} - P)P^{-1}. \quad (17)$$

Here the diag{diag{. . .}} denotes a square diagonal matrix with the same diagonal elements as the argument. The approximate MMSE solution, which takes into account observations (A) and (B), is as follows:

$$\hat{s} = \underline{B}^H P^{-1} [I_N - Q] y. \quad (18)$$

Recall that P is an N×N diagonal matrix, hence $P^{-1}$ yields N divisions. In terms of complexity, computing $P^{-1}$ and its product with an N×1 vector substitutes the equalization (i.e. computing $A^{-1}$ and its product with the received data) in the conventional OFDM. Note also that $\underline{B}$ and Q are band matrices with (2m+1) and (4m+1) nonzero diagonals respectively. Therefore, the additional complexity of (18) is approximately [(4m+1)N+(2m+1)N+N], that is, (6m+3)

complex-valued multiplications and additions per subcarrier, as compared to the conventional OFDM demodulation without ICI cancellation.

FIG. 1 shows a block diagram of a transmission system according to the invention. The transmission system comprises a transmitter 10 and a receiver 20. The transmission system may comprise further transmitters 10 and receivers 20. The transmitter 10 transmits a multicarrier signal via a wireless channel to the receiver 20. The multicarrier signal may be an OFDM signal or a MC-CDMA signal. The receiver 20 comprises a demodulator 22 for demodulating the multicarrier signal. The demodulator 22 may be implemented by means of a FFT. The demodulated multicarrier signal, comprising vectors of received symbols, is supplied by the demodulator 22 to an equalizer 24. The equalizer 24 cancels intercarrier interference which may be included in the received multicarrier signal. The equalizer 24 outputs vectors of estimated symbols 25 (which have been derived from the vectors of received symbols) to a (soft) slicer 26. The slicer 26 produces soft metrics (soft decisions) and/or binary estimates (hard decisions) of the coded bits to be used in the further signal processing parts of the receiver (which are not shown), e.g. a FEC decoder.

The equalizer 24 may comprise a reduced complexity filter for deriving a vector of estimated symbols 25 from a vector of received symbols 23. The reduced complexity filter may be a FIR filter which implements the function $F = \underline{B}^H P^{-1} [I_N - Q] Y$ (see expression (18)). The FIR filter has (4m+1) taps and varies depending on the subcarrier. According to (18), the tap coefficients corresponding to the k-th subcarrier are given by (4m+1) nonzero entries of the k-th row of F (recall that F is a band matrix with a non-zero band of width (4m+1)).

Another approach to construct an ICI-proof multicarrier transmission system has been proposed in the above mentioned paper. This approach makes use of a linear FIR filter in order to suppress the ICI. More specifically, the paper suggests the use of a linear FIR zero forcing (ZF) equalizer. In the transmission system according to the invention an MMSE equalizer is used which guarantees a better performance in terms of the output SINR. Furthermore, in the transmission system according to the invention an accurate first order approximation of the inverse leakage matrix is used (which first order approximation is relatively accurate because of a relatively low ICI level) to efficiently implement the MMSE equalizer. In the known transmission system the inverse of the whole matrix $\underline{C}$ is approximated by a set of inverses of its diagonal blocks of a finite size. Hence, it is necessary to invert a (4m+1)×(4m+1) block of the matrix $\underline{C}$ for each subcarrier, thereby providing a local (ZF) equalization. The computational burden of such a solution appears to be much higher than the burden of our approach, given the fact that the complexity of matrix inversion is cubic with respect to the matrix size.

The table below shows the estimated number of real-valued operations per subcarrier for different m that is required to compute the equalizer coefficients by the method according to the invention and by the known method as disclosed in the above mentioned paper. One can see that the known method yields a prohibitive complexity even at moderate m.

| M | Method | # of multiplications | # of divisions | # of additions |
|---|--------|---------------------|----------------|----------------|
| 1 | paper | 612 | 5 | 61 |
|   | invention | 96 | 2 | 18 |
| 2 | paper | 2760 | 9 | 300 |
|   | invention | 180 | 2 | 36 |
| 3 | paper | 7484 | 13 | 847 |
|   | invention | 280 | 2 | 62 |
| 4 | paper | 15808 | 17 | 1830 |
|   | invention | 396 | 2 | 96 |

Figure 2:
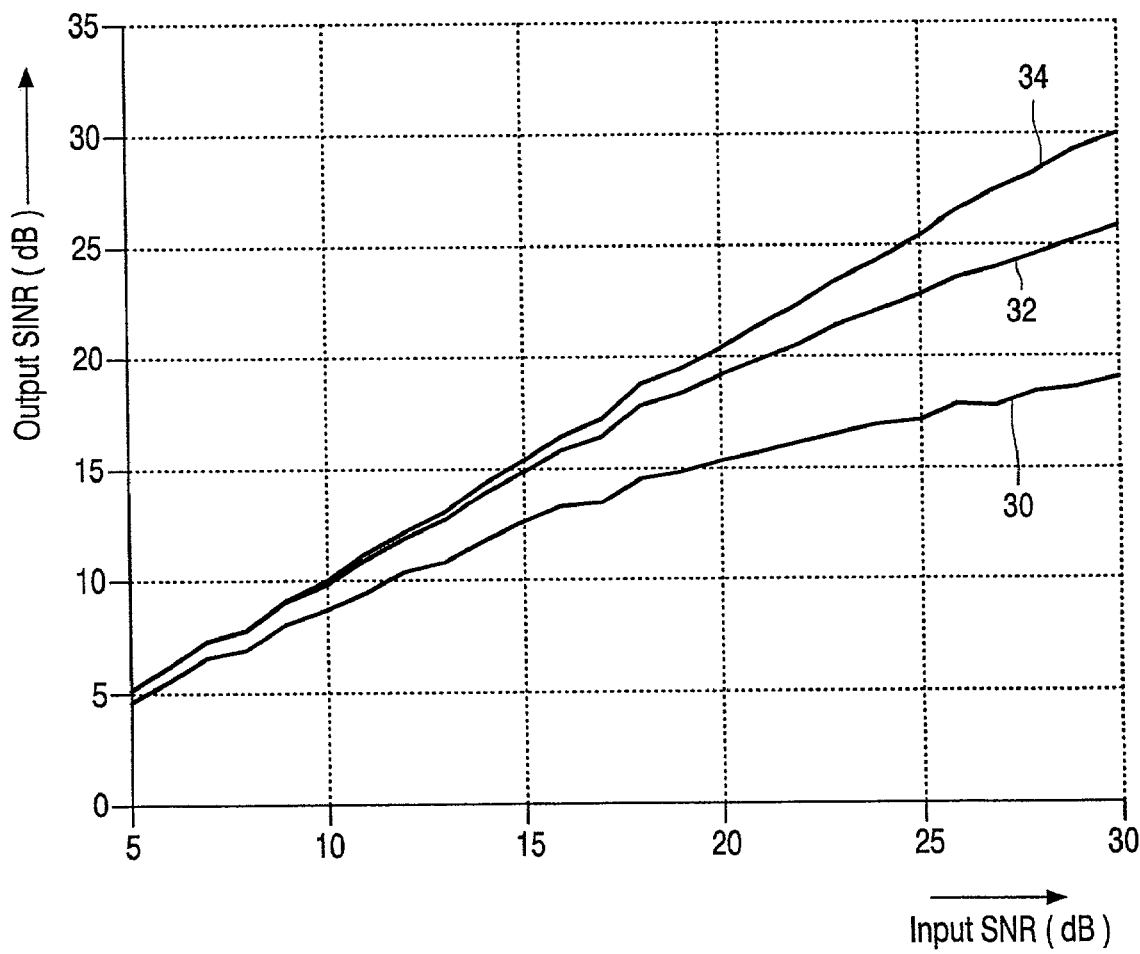
FIGS. 2 and 3 show graphs illustrating the performance of the transmission system according to the invention.
Figure 3:
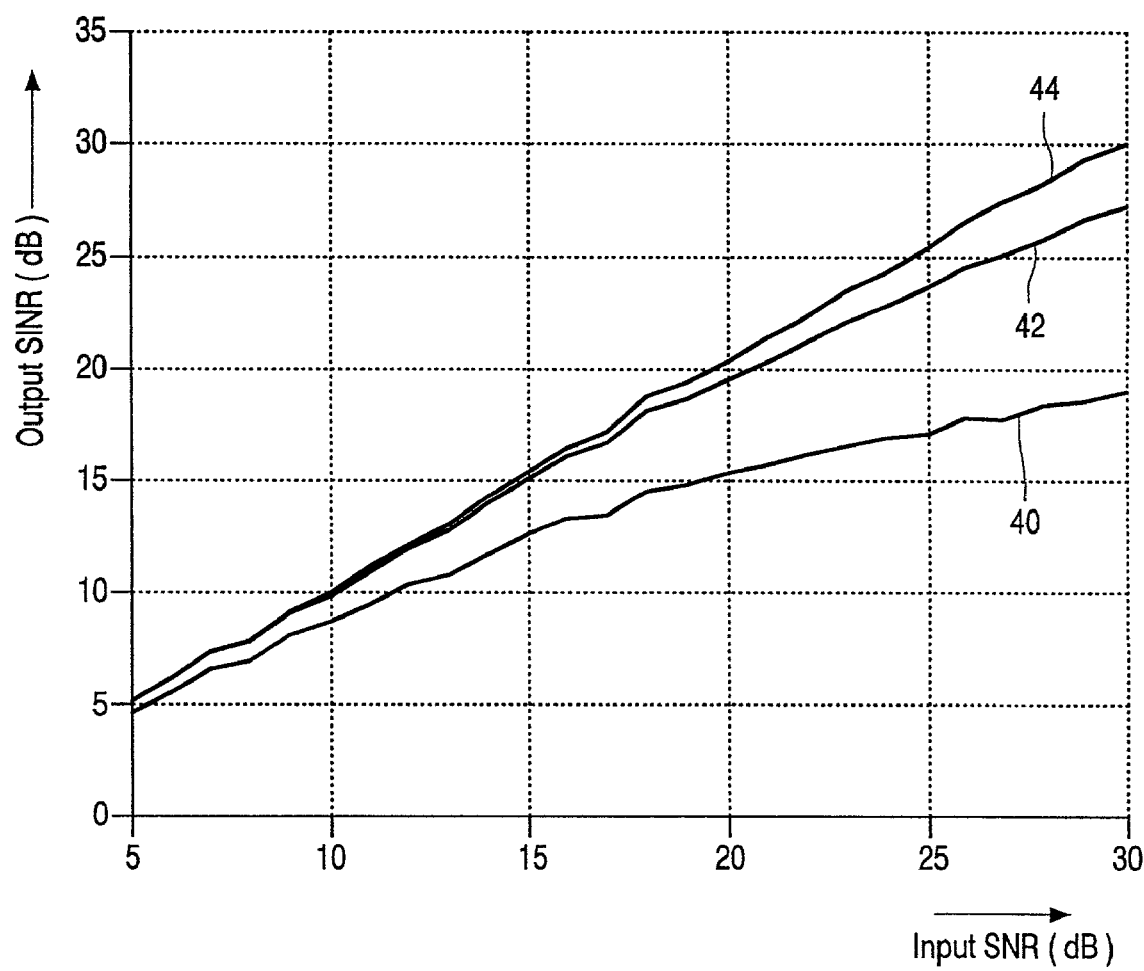

In FIGS. 2 and 3 the performance of the transmission system according to the invention (i.e. with reduced complexity filtering) is compared to a conventional OFDM transmission system (i.e. without any ICI cancellation). Furthermore, a transmission system with an exact MMSE equalizer (i.e. the inverse matrix is calculated exactly) is also used as a benchmark. Here, a WLAN scenario is considered. A total number of N subcarriers is transmitted in the 17 GHz band with a signal bandwidth of 2 MHz. We assume that the propagation channel has a RMSE delay spread of 50 ns and that a cyclic prefix accommodates the overall ISI spread. Furthermore, the receiver is assumed to move at a speed of 200 km/h. Such a choice of parameters is motivated by the fact that in this scenario, the ICI level resulting from the Doppler spread is roughly the same as in the 8k mode of DVB-T when the speed of the receiver is around 100 km/h. A direct simulation of DVB-T has not been addressed because of a big (I)FFT complexity.

In FIGS. 2 and 3, the output SINR values, averaged over the whole set of subcarriers and 1000 independent channel trials, are plotted versus the corresponding input SNR values for band factors m=3 and m=10 respectively. Graphs 30 and 40 represent the behavior of the conventional OFDM transmission system. Graphs 32 and 42 represent the behavior of the transmission system according to the invention. Graphs 34 and 44 represent the behavior of the transmission system with exact MMSE equalizer. As expected, the ICI floor (around 20 dB for the conventional OFDM transmission system) disappears when the exact MMSE equalizer is used. A simplified MMSE solution, as described above, allows to decrease the ICI floor by at least 5 dB. This gain slightly changes along with the band parameter m. Namely, the (1/m) rule suggests a difference of 5.2 dB in the residual ICI between m=3 and m=10. Hence, the performance of MMSE solution with m=10 and the exact matrix inversion sticks closer to that of the exact MMSE (i.e. with m=N). Indeed, the difference in the residual ICI caused by the band approximation stays beneath the additive noise level. Apparently, the gap between the exact MMSE and our simplified solution is due to the approximate matrix inversion.

Although in the above mainly an OFDM transmission system is described, the invention is also and equally well applicable to other multicarrier transmission systems such as MC-CDMA transmission systems. The reduced complexity filter may be implemented by means of digital hardware or by means of software which is executed by a digital signal processor or by a general purpose microprocessor.

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim.

Use of the word "a" or "an" preceding an element does not exclude the presence of a plurality of such elements.

The invention claimed is:

1. A transmission system, the transmission system comprising:
    a transmitter for transmitting a multicarrier signal; and
    a receiver for receiving the multicarrier signal from the transmitter, the receiver comprising an equalizer for canceling intercarrier interference included in the received multicarrier signal, wherein the equalizer comprises a fitter having a complexity less than cubic with respect to a number of subcarriers, said filter deriving a vector of estimated symbols from a vector of received symbols;
    wherein said filter is implemented by approximating an inverse matrix $R^{-1}$.

2. the transmission system according to claim 1, wherein the equalizer is a MMSE equalizer.

3. The transmission system according to claim 1, wherein the reduced complexity filter implements a multiplication of an approximation of the inverse matrix $R^{-1}$ with the vector of received symbols.

4. The transmission system according to claim 3, wherein the approximation of the inverse matrix $R^{-1}$ is a first order approximation.

5. A receiver for receiving a multicarrier signal from a transmitter, the receiver comprising an equalizer for canceling intercarrier interference included in the received multicarrier signal, wherein the equalizer comprises a filter having a complexity less than cubic with respect to a number of subcarriers, said filter deriving a vector of estimated symbols from a vector of received symbols;
    wherein said filter is implemented by approximating an inverse matrix $R^{-1}$.

6. the receiver according to claim 5, wherein the equalizer is a MMSE equalizer.

7. The receiver according to claim 5, wherein the reduced complexity filter implements a multiplication of an approximation of the inverse matrix $R^{-1}$ with the vector of received symbols.

8. The receiver according to claim 7, wherein the approximation of the inverse matrix $R^{-1}$ is a first order approximation.

9. An equalizer for canceling intercarrier interference included in the received multicarrier signal, wherein the equalizer comprises a filter having a complexity less than cubic with respect to a number of subcarriers, said filter deriving a vector of estimated symbols from a vector of received symbols;
    wherein said filter is implemented by approximating an inverse matrix $R^{-1}$.

10. The equalizer according to claim 9, wherein the equalizer is a MMSE equalizer.

11. The equalizer according to claim 9, wherein the reduced complexity filter implements a multiplication of an approximation of the inverse matrix $R^{-1}$ with the vector of received symbols.

12. The equalizer according to claim 11, wherein the approximation of the inverse matrix $R^{-1}$ is a first order approximation.

13. A method for canceling intercarrier interference included in a received multicarrier signal, the method comprising filtering a vector of received symbols with a filter having a complexity less than cubic with respect to a number of subcarriers in order to derive a vector of estimated symbols;
    wherein said filter is implemented by approximating an inverse matrix $R^{-1}$.

14. The method according to claim 13, wherein the reduced complexity filter implements a multiplication of an approximation of the inverse matrix $R^{-1}$ with the vector of received symbols.

15. The method according to claim 14, wherein the approximation of the inverse matrix $R^{-1}$ is a first order approximation.

* * * * *